US006722024B2

(12) United States Patent
Chow

(10) Patent No.: US 6,722,024 B2
(45) Date of Patent: Apr. 20, 2004

(54) PUSH-POP COIN CELL BATTERY COMPARTMENT AND METHOD OF USE THEREOF

(75) Inventor: Kit Man Chow, Wanchai (HK)

(73) Assignee: GSL Research Technology Limited, Wanchai (HK)

( * ) Notice: Subject to any disclaimer, the term of this patent is extended or adjusted under 35 U.S.C. 154(b) by 238 days.

(21) Appl. No.: 09/818,742

(22) Filed: Mar. 27, 2001

(65) Prior Publication Data

US 2001/0009065 A1 Jul. 26, 2001

Related U.S. Application Data

(62) Division of application No. 09/302,318, filed on Apr. 29, 1999.

(51) Int. Cl.[7] .......................... H01R 43/00; H01M 2/10

(52) U.S. Cl. ............................. 29/825; 29/832; 29/834; 29/425; 29/426.1; 429/96; 429/97; 429/98; 429/100

(58) Field of Search .......................... 29/825, 832, 834, 29/425, 426.1, 622; 455/351; 429/96, 97, 98, 100; 361/752, 753

(56) References Cited

U.S. PATENT DOCUMENTS 3,984,257 A * 10/1976 Zurcher ......................... 429/1
3,999,110 A * 12/1976 Ramstrom et al. .......... 320/112
4,559,588 A * 12/1985 Engelson et al. ........... 362/196
4,731,306 A * 3/1988 Dumbser ..................... 429/98
4,828,944 A * 5/1989 Yabe et al. ................... 429/97
5,039,580 A * 8/1991 Mori et al. ................... 429/97
5,193,220 A * 3/1993 Ichinohe et al. ............ 455/343
5,299,108 A * 3/1994 Griffin ........................ 362/189
5,369,802 A * 11/1994 Murray ........................ 455/351
5,552,240 A * 9/1996 Derstine ...................... 429/96
5,752,762 A 5/1998 Chen .......................... 362/202
5,843,595 A * 12/1998 Kawakatsu .................. 429/97
6,294,285 B1 * 9/2001 Gosior et al. ................. 429/96

* cited by examiner

*Primary Examiner*—Carl J. Arbes
*Assistant Examiner*—Tai Nguyen
(74) *Attorney, Agent, or Firm*—Darby & Darby

(57) ABSTRACT

A battery replacement system and method for electronic devices which does not require a back-up battery or storage capacitor. A battery is placed within a tunnel formed in the electronic device. The tunnel has an input opening and an output opening. During use, the battery resides within the tunnel where it makes electrical contact with the power terminals of the device. When the battery is exhausted and needs to be replaced, a new battery is introduced into the tunnel via the input opening. As the new battery enters the tunnel, it makes electrical contact with the power terminals, while at the same time serving to push the exhausted battery out the output opening of the tunnel. The tunnel is configured such that the new battery makes electrical contact with the power terminals before the exhausted battery loses contact with the terminals. In this way, there is no interruption in power being supplied to the electronic device.

10 Claims, 3 Drawing Sheets

PUSH-POP COIN CELL BATTERY COMPARTMENT AND METHOD OF USE THEREOF

CROSS-REFERENCE TO RELATED APPLICATIONS

This application is a divisional application of U.S. Ser. No. 09/302,318, filed Apr. 29, 1999, which is hereby incorporated herein by reference in its entirety.

FIELD OF THE INVENTION

The present invention generally relates to the field of electronics. More specifically, the present invention relates to a battery replacement system and method for electronic devices.

BACKGROUND OF THE INVENTION

Most battery powered or portable electronic devices typically include a battery as the power source for the device. In the case of electronic devices with memory, or other devices that require continuous operation, there exists the problem of replacing the battery once it is exhausted, while at the same time providing continuous operation or maintaining the memory contents during the battery removal process. One solution to the battery removal process is the use of a battery back-up. Essentially, this involves the addition of a second battery in parallel with the primary battery. When the primary battery is removed and replaced, the back-up battery provides power until a new battery is inserted. Once the new battery is inserted, it provides primary power. The back-up battery is then disconnected and conserved for future back-up operations. While this solution provides continuous operation and maintains memory contents, it nevertheless introduces additional cost and complexity. Specifically, an additional back-up battery is required, along with any required switching electronics and contacts. This latter requirement may be somewhat onerous since oftentimes the back-up battery is situated in a somewhat inaccessible internal location to prevent inadvertent dislodging of the back-up battery. The use of a back-up battery also requires more space.

An alternative approach to the battery removal process is the use of a large capacitor as a temporary power device during the battery removal process. In this approach, a large capacitor is constantly maintained in a charged condition by the battery. When it comes time to replace the battery and the battery is removed, the charged capacitor is used to provide power until the new battery is installed. Again, this approach is undesirable because of the increased cost, space and complexity associated with the capacitor and the required components. Also, this approach provides only a limited solution, since most capacitors used for this application are able to provide power only for a limited time, typically on the order of 5–15 seconds.

Therefore, there exists a need for a simple, yet effective, method for battery removal which provides continuous power without substantially increasing cost or complexity.

SUMMARY OF THE INVENTION

The present invention is for a battery replacement system and method for electronic devices which does not require a back-up battery or storage capacitor. According to the present invention, a battery is placed within a tunnel formed in the electronic device. The tunnel has an input opening and an output opening. During use, the battery resides within the tunnel where it makes electrical contact with the power terminals of the device. When the battery is exhausted and needs to be replaced, a new battery is introduced into the tunnel via the input opening. As the new battery enters the tunnel, it makes electrical contact with the power terminals, while at the same time serving to push the exhausted battery out the output opening of the tunnel. The tunnel is configured such that the new battery makes electrical contact with the power terminals before the exhausted battery loses contact with the terminals. In this way, there is no interruption in power being supplied to the electronic device.

The present invention will become more apparent from the following Brief Description of the Drawings and Description of Preferred Embodiments.

DESCRIPTION OF PREFERRED EMBODIMENTS

Figure 1:
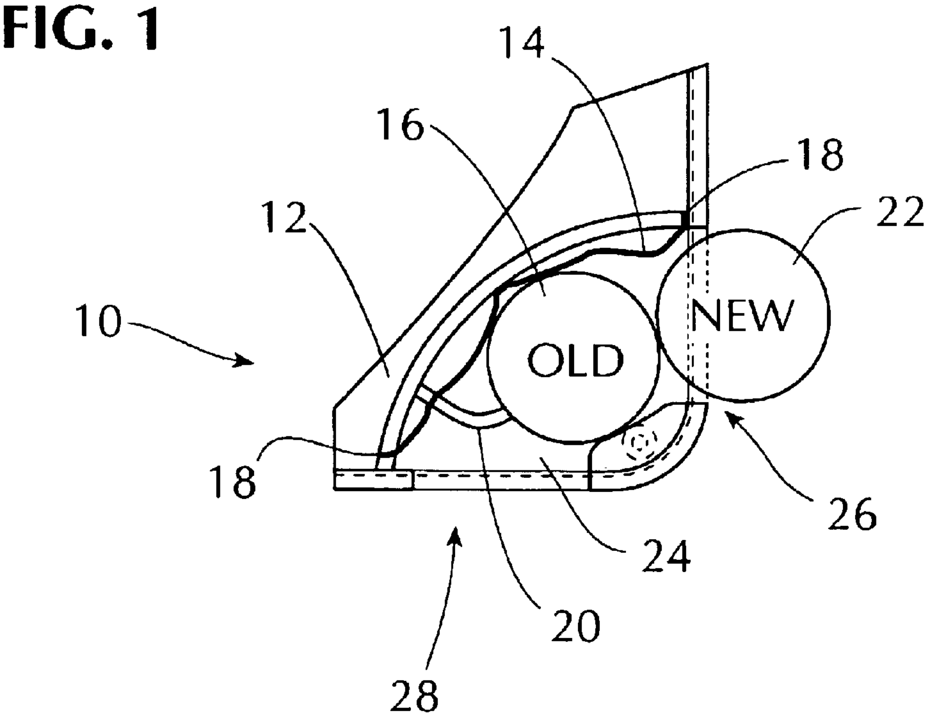
FIG. 1 is a partial cross sectional view of an electronic device showing the battery tunnel according to the present invention, with the “old” battery in place.

FIGS. 1–4 illustrate, in sequence, the insertion of a new battery and removal of an old battery in accordance with one embodiment of the present invention. Referring now to FIG. 1, therein is shown an electronic device 10 in partial cross section. The electronic device 10 includes a circuit board 12, to which is attached a spring 14. The spring 14 may be a brass or stainless steel cut-sheet metal which is preformed to have the proper shape and design for proper battery retention and contact. The spring 14 is biased to make contact with a battery 16, and in particular, the positive pole of the battery 16. Battery 16 may be any appropriate type of coin-cell battery, such as CR2032, CR2025, CR2016, or other types of batteries as discussed herein. In the case of a coin cell battery, the positive terminal may include the circumferential portion of the battery, in which case the spring is biased to make contact with the side of the battery. Alternatively, the spring 14 may be biased to make contact with the top surface of the battery. For other types of batteries, such as cylindrical cells (e.g., “AA”, “AAA”, etc.), the spring is accordingly biased and configured to make contact with the positive pole. In the present description, the spring used to contact the positive pole; however, it should be understood that the spring may also be used to contact the negative pole, depending on the particular design requirements and choices. The spring 14 is electrically connected to circuit board 12 at one or more contact points 18. Circuit board 12 also includes one or more conductive traces 20 for contacting the negative pole of the battery 16, which is located on the underside of the battery in the case of a coin cell.

Figure 2:
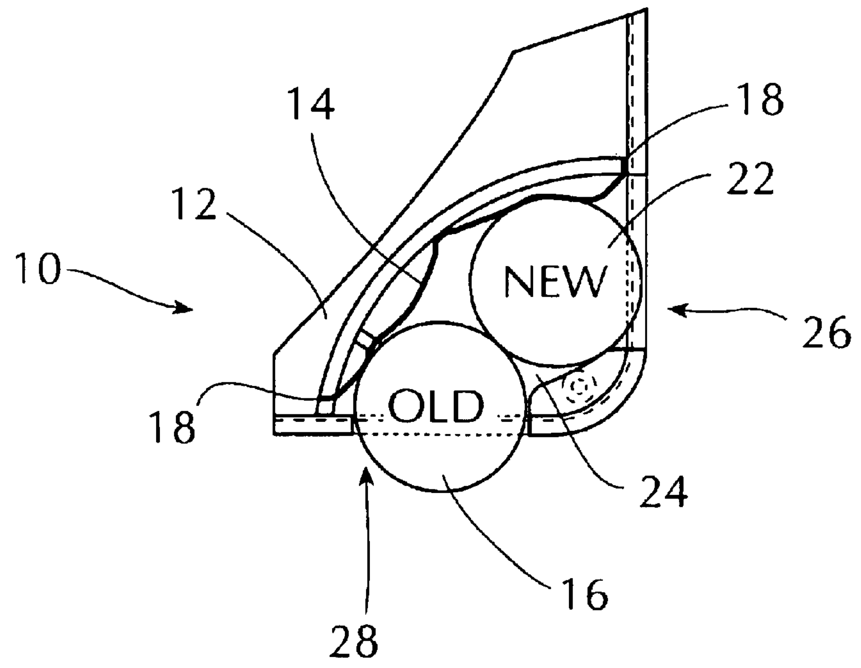
FIG. 2 is a partial cross sectional view of an electronic device showing the battery tunnel according to the present invention, with the “old” battery partially removed and the “new” battery partially in place.
Figure 3:
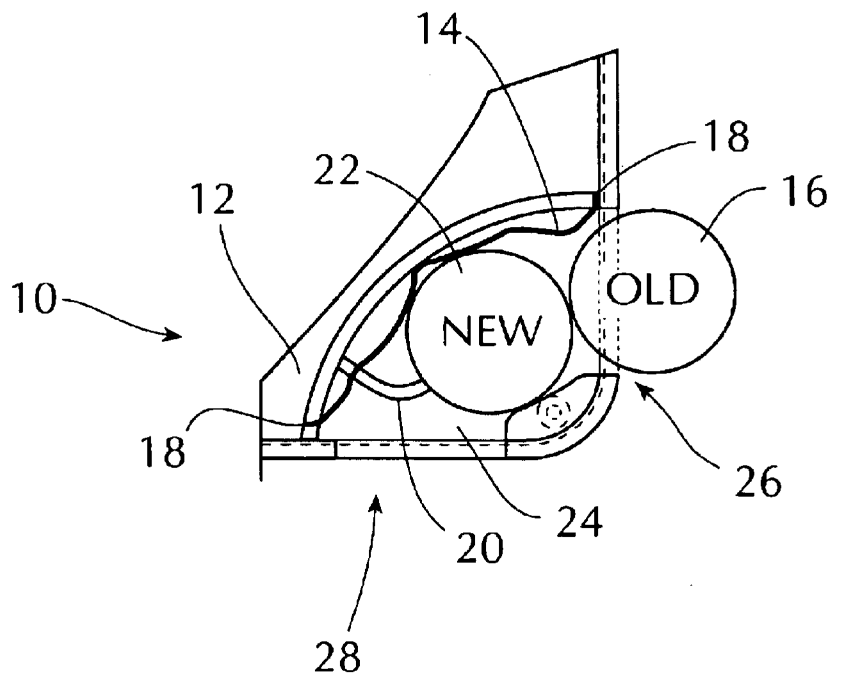
FIG. 3 is a partial cross sectional view of an electronic device showing the battery tunnel according to the present invention, with the “new” battery being positioned in its final position.

FIG. 1 illustrates the "old" battery 16 in its installed position. Once it is desired to replace the "old" battery 16, a "new" battery 22 is inserted into the tunnel 24 via the input opening 26. As the "new" battery 22 is inserted, it makes contact with the "old" battery 16 and starts pushing the "old" battery 16 out the tunnel 24 via output opening 28. At the same time, "new" battery 22 begins to make electrical contact with spring 14 and conductive trace 20. This is shown in FIG. 2 with the "new" battery 22 more fully inserted than in FIG. 1. It is important to note that the "old" battery 16 is not completely dislodged until "new" battery 22 has fully made contact with spring 14 and conductive trace 20. This ensures that continuous power is being supplied to the electronic device 10.

Figure 4:
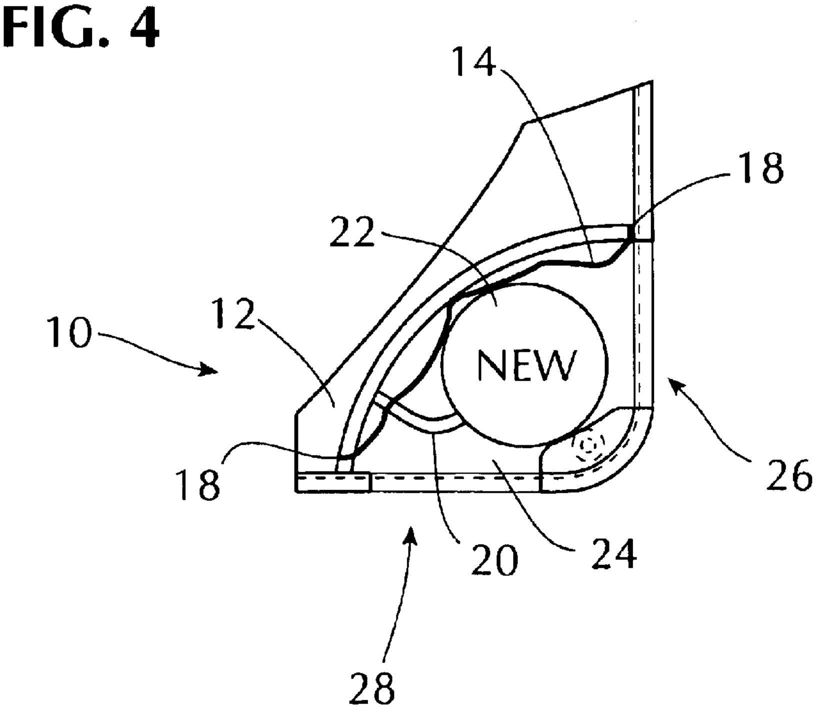
FIG. 4 is a partial cross sectional view of an electronic device showing the battery tunnel according to the present invention, with the “new” battery in its final position.

Once the "old" battery 16 is completely dislodged (FIG. 3), it may be used to push against "new" battery 22 by way of the input opening 26 to ensure that "new" battery 22 is properly seated and positioned within the tunnel 24. FIG. 4 illustrates "new" battery 22 in its final, fully inserted position.

In the case of a battery being installed for the first time in electronic device 10, the battery may be initially pushed in via input opening 26. The continued pushing in of the battery to properly position the battery may be accomplished using a coin or other similar flat article to continue the pushing in until the battery is properly seated within the tunnel.

While the embodiment described herein has been described and illustrated as having a circular or arcuate shaped tunnel, it should be understood that generally any tunnel shape which allows insertion at one end and removal at another end may be used in connection with the present invention. For example, a straight tunnel may be used. Also, the battery may be inserted at either end of the tunnel, depending on the particular configuration desired.

Figure 5:
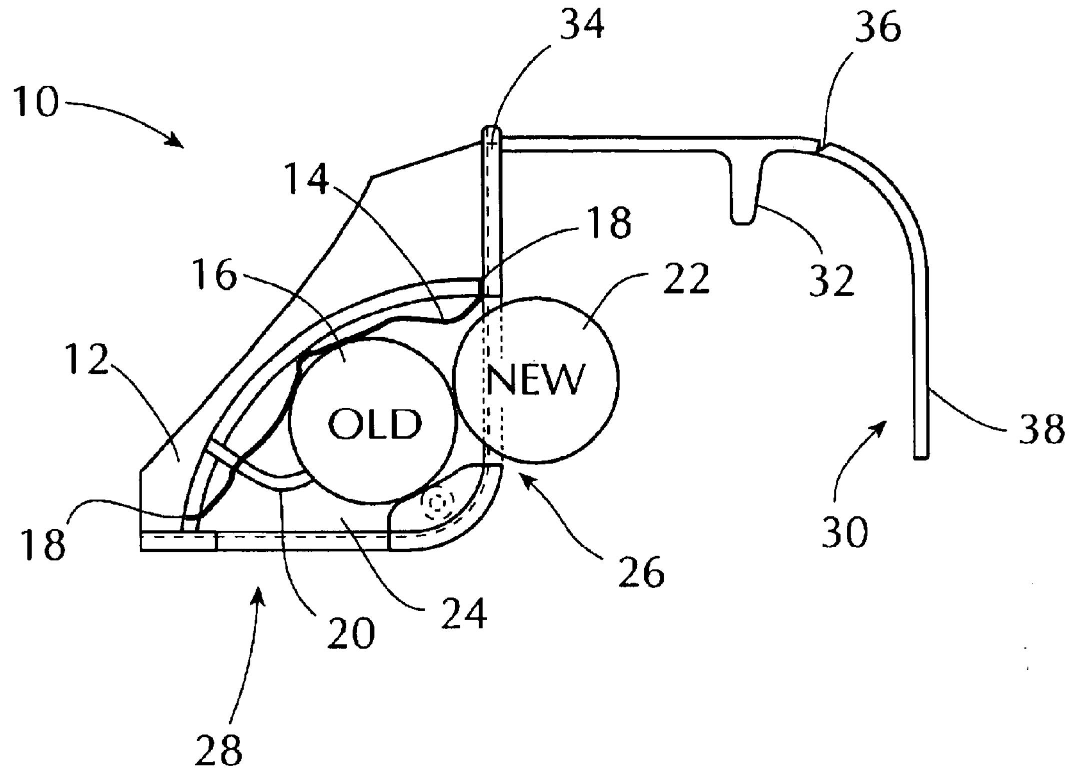
FIG. 5 is a partial cross sectional view of an electronic device showing an alternative embodiment of the present invention including a pronged door, with the “old” battery in place.

FIG. 5 illustrates a partial cross sectional view of an electronic device showing an alternative embodiment of the present invention including a pronged door 30 having a prong or projection 32. The prong 32 acts to effect automatic insertion and pushing in of the "new" battery 22, thereby eliminating the manual pushing in of the "new" battery 22. The door 30 is shown in the open position with the "old" battery 16 in place, and a "new" battery positioned for insertion. In operation, the door 30 swings about a hinge point 34 towards the electronic device 10. As the door 30 swings to its closed position, the prong 32 comes into contact with the "new" battery 22, pushing the "new" battery into place. The prong 32 is sized such that as the door 30 achieves its closed position, the prong is able to push the "new" battery 22 into proper position. The door 30 may be provided with a hinge 36 so that the terminal end 38 may be held in an open position until the "old" battery is removed. Once the "old" battery is removed, the hinged portion of the door may then be moved to a closed position to seal the battery compartment. Alternatively, the door 30 may be formed of a slightly deformable material which allows the terminal portion 38 to be bent to achieve the same function.

While the invention has been particularly shown and described with reference to a preferred embodiment thereof, it will be understood by those skilled in the art that various changes in form and details may be made therein without departing from the spirit and scope of the invention.

What is claimed is:

1. A method of inserting a first battery and removing a second battery from a housing, said housing having a first opening and a second opening, comprising the following steps:

placing said first battery into said first opening; and pushing said first battery in an inward direction relative to said first opening, thereby causing said second battery to be pushed out said second opening;

wherein each of said first and second batteries includes a planar terminal and a circumferential terminal, said circumferential terminal having a corresponding electrical spring contact having a substantially arcuate shape and adapted to mate with said circumferential terminal.

2. The method of claim 1, wherein said first and second openings are connected by way of a substantially curved passage.

3. The method of claim 1, wherein said first and second openings are connected by way of a substantially straight passage.

4. The method of claim 1, further comprising the steps of causing said circumferential terminal of said first battery to make contact with a positive electrical contact within said housing and causing said planar terminal of said first battery to make contact with a negative electrical contact within said housing.

5. The method of claim 4, wherein said electrical contacts and said circumferential and planar terminals of said first battery make contact prior to said second battery losing electrical contact with said positive and negative contacts.

6. A method of inserting a first battery and removing a second battery from a housing having a first opening and a second opening, comprising the following steps:

placing said first battery into said first opening;

providing a door adjacent said first battery opening and including a projection extending in the direction of said first battery opening;

utilizing said projection to push said first battery in an inward direction relative to said first opening when said door is moved to a closing position, thereby causing said second battery to be pushed out said second opening.

7. The method of claim 6, further comprising the steps of causing a positive terminal of said first battery to make contact with a positive electrical contact within said housing and causing a negative terminal of said first battery to make contact with a negative electrical contact within said housing.

8. The method of claim 7, wherein said electrical contacts and said terminals of said first battery make contact prior to said second battery losing electrical contact with said positive and negative contacts.

9. A method of inserting a first battery and removing a second battery from a housing having a first opening and a second opening, comprising the following steps:

placing said first battery into said first opening;

providing a door adjacent said first battery opening and including a projection extending in the direction of said first battery opening; and utilizing said projection to push said first battery in an inward direction relative to said first opening, thereby causing said second battery to be pushed out said second opening, wherein said door is provided with a hinge to thereby divide said door into a first portion and a second portion, said first portion carrying said projection, and wherein said method further comprises the step of closing said first portion of said door to push in said first battery, and subsequently closing said second portion of said door after said second battery is pushed out said second opening.

10. A method of inserting a first battery and removing a second battery from a housing having a first opening and a second opening, comprising the following steps:

placing said first battery into said first opening;

providing a door adjacent said first battery opening and including a projection extending in the direction of said first battery opening;

utilizing said projection to push said first battery in an inward direction relative to said first opening, thereby causing said second battery to be pushed out said second opening, wherein said door is formed of a substantially deformable material such that said door may be closed to cause said projection to push said first battery, while still maintaining said second opening substantially open.

* * * * *